(12) United States Patent
Takasaki et al.

(10) Patent No.: US 12,461,258 B2
(45) Date of Patent: Nov. 4, 2025

(54) RADIATION IMAGING APPARATUS THAT DETERMINES TIMING OF SAMPLING AND HOLDING

(71) Applicant: CANON KABUSHIKI KAISHA, Tokyo (JP)

(72) Inventors: Takashi Takasaki, Kanagawa (JP); Atsushi Iwashita, Tokyo (JP); Kosuke Terui, Kanagawa (JP); Ryuichi Fujimoto, Tokyo (JP); Takeshi Noda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 18/365,395

(22) Filed: Aug. 4, 2023

(65) Prior Publication Data

US 2024/0053497 A1 Feb. 15, 2024

(30) Foreign Application Priority Data

Aug. 10, 2022 (JP) ................................. 2022-128465

(51) Int. Cl.
*G01T 1/29* (2006.01)
(52) U.S. Cl.
CPC .......... *G01T 1/2992* (2013.01); *G01T 1/2928* (2013.01); *G01T 1/2978* (2013.01)
(58) Field of Classification Search
CPC .... G01T 1/2992; G01T 1/2928; G01T 1/2978
See application file for complete search history.

(56) References Cited

U.S. PATENT DOCUMENTS

| 6,404,851 | B1 * | 6/2002 | Possin ................... G01T 1/2928 |
| | | | 348/E3.019 |
| 8,197,137 | B2 | 6/2012 | Takasaki |
| 8,355,594 | B2 | 1/2013 | Noda |
| 8,503,607 | B2 | 8/2013 | Takasaki |
| 8,655,034 | B2 | 2/2014 | Noda |
| 8,744,210 | B2 | 6/2014 | Noda |
| 8,923,589 | B2 | 12/2014 | Noda |
| 9,014,450 | B2 | 4/2015 | Noda |
| 9,048,154 | B2 | 6/2015 | Takenaka |
| 9,128,196 | B2 | 9/2015 | Sato |

(Continued)

FOREIGN PATENT DOCUMENTS

JP 2019-24926 A 2/2019

*Primary Examiner* — Hugh Maupin
(74) *Attorney, Agent, or Firm* — VENABLE LLP

(57) ABSTRACT

A radiation imaging apparatus includes a pixel array having a plurality of pixels configured to detect radiation, and a controller configured to obtain a radiation generation condition related to a radiation generating apparatus during fluoroscopic imaging, and determine, during the fluoroscopic imaging, timings of a plurality of sampling and holding operations in each of the plurality of pixels in accordance with the radiation generation condition. The timing of at least one sampling and holding operation is a timing in an irradiation period of radiation, and each of the plurality of pixels includes a conversion element configured to convert radiation into an electrical signal, and a sample and hold circuit configured to sample and hold signals from the conversion element multiple times in accordance with the timings, determined by the controller, of the plurality of sampling and holding operations.

20 Claims, 13 Drawing Sheets

(56) References Cited

U.S. PATENT DOCUMENTS

| | | | |
|---|---|---|---|
| 9,134,432 B2 | 9/2015 | Iwashita | |
| 9,234,966 B2 | 1/2016 | Sugawara | |
| 9,423,512 B2 | 8/2016 | Sato | |
| 9,445,030 B2 | 9/2016 | Yagi | |
| 9,462,989 B2 | 10/2016 | Takenaka | |
| 9,468,414 B2 | 10/2016 | Ryu | |
| 9,470,800 B2 | 10/2016 | Iwashita | |
| 9,470,802 B2 | 10/2016 | Okada | |
| 9,541,653 B2 | 1/2017 | Iwashita | |
| 9,655,586 B2 | 5/2017 | Yagi | |
| 9,737,271 B2 | 8/2017 | Iwashita | |
| 9,812,474 B2 | 11/2017 | Yagi | |
| 9,820,713 B2 | 11/2017 | Noda | |
| 9,953,414 B2 | 4/2018 | Noda | |
| 9,971,046 B2 | 5/2018 | Ryu | |
| 9,980,685 B2 | 5/2018 | Iwashita | |
| 9,989,656 B2 | 6/2018 | Sato | |
| 10,009,990 B2 | 6/2018 | Takenaka | |
| 10,197,684 B2 | 2/2019 | Terui | |
| 10,274,612 B2 | 4/2019 | Ishil | |
| 10,441,238 B2 | 10/2019 | Terui | |
| 10,779,777 B2 | 9/2020 | Terui | |
| 10,782,251 B2 | 9/2020 | Sato | |
| 11,047,808 B2 | 6/2021 | Iwashita | |
| 11,047,994 B2 | 6/2021 | Terui | |
| 11,125,702 B2 | 9/2021 | Hayashida | |
| 11,185,301 B2 | 11/2021 | Torii | |
| 11,187,816 B2 | 11/2021 | Takenaka | |
| 11,252,349 B2 | 2/2022 | Kosuge | |
| 11,280,919 B2 | 3/2022 | Takenaka | |
| 11,303,831 B2 | 4/2022 | Iwashita | |
| 11,357,455 B2 | 6/2022 | Noda | |
| 11,360,034 B2 | 6/2022 | Torii | |
| 11,430,161 B2 | 8/2022 | Iwashita | |
| 11,531,122 B2 | 12/2022 | Terui | |
| RE49,401 E | 1/2023 | Iwashita | |
| 11,635,392 B2 | 4/2023 | Noda | |
| 11,686,691 B2 | 6/2023 | Iwashita | |
| 2002/0001366 A1* | 1/2002 | Tamura | A61B 6/06 378/154 |
| 2005/0109927 A1* | 5/2005 | Takenaka | G01T 1/2928 250/252.1 |
| 2008/0011958 A1* | 1/2008 | Endo | A61B 6/4488 250/370.08 |
| 2009/0001276 A1* | 1/2009 | Yagi | H04N 23/81 378/114 |
| 2013/0193334 A1* | 8/2013 | Dowaki | H04N 25/65 250/394 |
| 2020/0150286 A1 | 5/2020 | Terui | |
| 2021/0118193 A1 | 4/2021 | Torii | |
| 2021/0236078 A1 | 8/2021 | Noda | |
| 2022/0047238 A1 | 2/2022 | Terui | |
| 2022/0120919 A1 | 4/2022 | Terui | |
| 2022/0142597 A1 | 5/2022 | Noda | |
| 2022/0167935 A1 | 6/2022 | Iwashita | |
| 2023/0309942 A1 | 10/2023 | Noda | |

\* cited by examiner

FIG. 8A    FIRST TIMING

| TUBE CURRENT [mA] | IRRADIATION TIME [ms] | | | |
|---|---|---|---|---|
| | 10ms | 12ms | 16ms | 20ms |
| 80mA | 4.8 | 5.6 | 7.1 | 8.6 |
| 100mA | 4.7 | 5.4 | 6.9 | 8.4 |
| 125mA | 4.5 | 5.2 | 6.6 | 8.0 |
| 160mA | 4.3 | 5.0 | 6.3 | 7.6 |

FIG. 8B    SECOND TIMING

| TUBE CURRENT [mA] | IRRADIATION TIME [ms] | | | |
|---|---|---|---|---|
| | 10ms | 12ms | 16ms | 20ms |
| 80mA | 8.4 | 9.9 | 12.8 | 15.8 |
| 100mA | 8.2 | 9.6 | 12.4 | 15.3 |
| 125mA | 7.8 | 9.2 | 11.9 | 14.7 |
| 160mA | 7.4 | 8.7 | 11.2 | 13.8 |

RADIATION IMAGING APPARATUS THAT DETERMINES TIMING OF SAMPLING AND HOLDING

BACKGROUND OF THE INVENTION

Field of the Invention

The disclosed technique relates to a radiation imaging apparatus, a radiation imaging system, a control apparatus, a control method of the radiation imaging apparatus, and a program for controlling the radiation imaging apparatus.

Description of the Related Art

Japanese Patent Laid-Open No. 2019-24926 describes a radiation imaging apparatus that includes a pixel array including a plurality of pixels, and a read circuit which reads out signals from the pixel array. The radiation imaging apparatus includes a detection unit that detects the start of irradiation of radiation based on the radiation emitted from a radiation source, and a controller that determines, each time the start of irradiation of radiation is detected by the detection unit, the timings of a plurality of sampling and holding operations in each of the plurality of pixels.

During fluoroscopic imaging, the posture of an object may be changed. With this, the portion where radiation passes through changes during the fluoroscopic imaging, and the irradiation condition or generation condition of radiation may need to be accordingly changed during the fluoroscopic imaging. However, Japanese Patent Laid-Open No. 2019-24926 does not describe that the timing of the sampling and holding operation is changed in accordance with a change of the posture of the object during fluoroscopic imaging or a corresponding change of the irradiation condition. If the timing of the sampling and holding operations is not changed in accordance with a change of the radiation generation condition, the quality of an image obtained by imaging can be degraded.

SUMMARY OF THE INVENTION

The disclosed technique provides a technique advantageous in suppressing a degradation in quality of an image caused by a change of a radiation generation condition during fluoroscopic imaging.

A radiation imaging apparatus comprising: a pixel array including a plurality of pixels configured to detect radiation; and a controller configured to obtain a radiation generation condition related to a radiation generating apparatus during fluoroscopic imaging, and determine, during the fluoroscopic imaging, timings of a plurality of sampling and holding operations in each of the plurality of pixels in accordance with the radiation generation condition, wherein the timing of at least one sampling and holding operation of the plurality of sampling and holding operations is a timing in an irradiation period of radiation, and each of the plurality of pixels includes a conversion element configured to convert radiation into an electrical signal, and a sample and hold circuit configured to sample and hold signals from the conversion element multiple times in accordance with the timings, determined by the controller, of the plurality of sampling and holding operations.

BRIEF DESCRIPTION OF THE DRAWINGS

FIGS. 8A and 8B are views exemplarily showing the timings of the plurality of sampling and holding operations in various radiation generation conditions;

DESCRIPTION OF THE EMBODIMENTS

Figure 1:
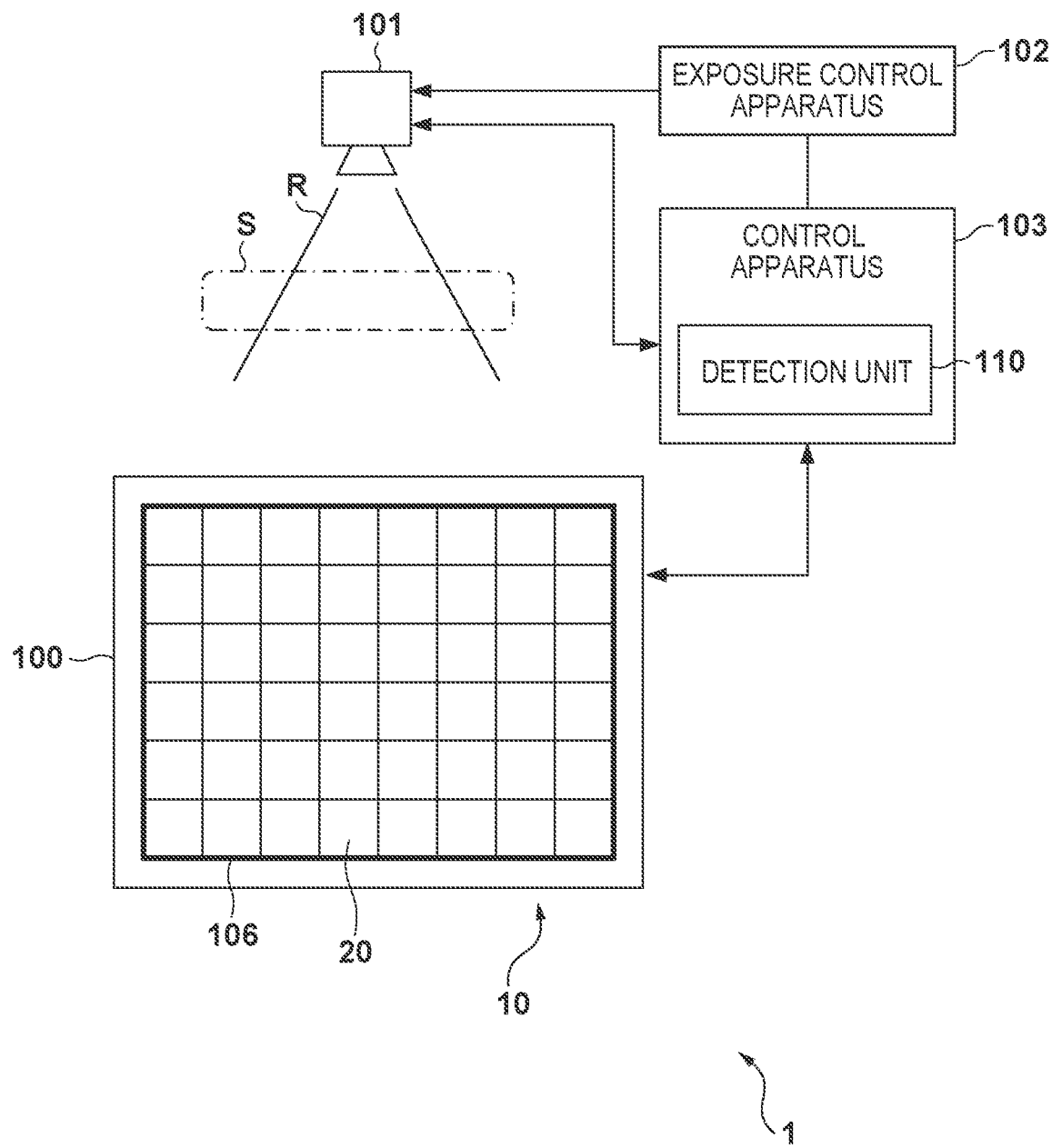
FIG. 1 is a schematic view exemplarily showing the configuration of a radiation imaging system common to the first to third embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following description, radiation includes not only α-rays, β-rays, and γ-rays that are beams generated by particles (including photons) emitted by radioactive decay but also beams having equal or more energy, for example, X-rays, particle rays, and cosmic rays. "Radiation" in the following description may be read as, for example, "X-rays".

FIG. 1 exemplarily shows the configuration of a radiation imaging system 1 according to the first embodiment. The radiation imaging system 1 can include, for example, a radiation generating apparatus 101, an exposure control apparatus 102, a control apparatus (or controller) 103, and a radiation detector 100. In one aspect, it may be understood that the radiation imaging system 1 includes a radiation imaging apparatus 10, and the radiation imaging apparatus 10 includes the radiation detector 100. It may be understood that the radiation imaging apparatus 10 includes the control apparatus 103 in addition to the radiation detector 100. It may be understood that the radiation imaging apparatus 10 includes the control apparatus 103 and the exposure control apparatus 102 in addition to the radiation detector 100. The control apparatus 103 can be formed from a computer (processor), and a memory that stores a program to be provided to the computer. The control apparatus 103 may be wholly or partially formed from a Digital Signal Processor (DSP) or a Programmable Logic Array (PLA).

When permitting irradiation (exposure) of radiation by the radiation generating apparatus 101, the control apparatus 103 can transmit an exposure permission signal to the exposure control apparatus 102. If the exposure permission signal is received from the control apparatus 103, the exposure control apparatus 102 causes the radiation generating apparatus 101 to perform irradiation (exposure) of radiation in response to the reception of the exposure permission signal. During fluoroscopic imaging for capturing a moving image, the control apparatus 103 transmits exposure permission signals to the exposure control apparatus 102 multiple times. In this case, the control apparatus 103 may transmit the exposure permission signals to the exposure control apparatus 102 multiple times at a predetermined cycle, or may transmit the exposure permission signals to the exposure control apparatus 102 each time the radiation detector 100 is ready to capture the next frame.

The radiation generating apparatus 101 can emit radiation whose energy (wavelength) changes in the continuous emission period (irradiation period) of radiation. By using the radiation as described above, radiation images in multiple energies different from each other are obtained, and by processing these radiation images by an energy subtraction method, one new radiation image can be obtained. The energy subtraction method is a method of processing a plurality of images obtained by performing imaging or acquisition a plurality of times while changing the energy of radiation with which an object is irradiated, thereby obtaining new radiation images (for example, a bone image and a soft tissue image). Alternatively, the radiation generating apparatus 101 may have a function of changing the energy (wavelength) of radiation. The radiation generating apparatus 101 can have a function of changing the energy of radiation by, for example, changing a tube voltage (a voltage applied between the cathode and the anode of the radiation generating apparatus 101).

The radiation generating apparatus 101 irradiates the radiation detector 100 with radiation R such as X rays via an object S. The exposure control apparatus 102 can control generation of radiation R by the radiation generating apparatus 101. Some or all of the functions of the exposure control apparatus 102 may be incorporated in the control apparatus 103. The control apparatus 103 can set the radiation generation condition (irradiation condition) in the radiation generating apparatus 101 in accordance with, for example, an instruction given to a user interface (not shown) from an operator. Alternatively, the exposure control apparatus 102 can set the radiation generation condition (irradiation condition) in the radiation generating apparatus 101. The radiation generating apparatus 101 can generate radiation in accordance with the set radiation generation condition. The radiation generation condition can include at least one of the time series data (waveform) of the tube voltage and the time series data (waveform) of the tube current. Alternatively, the radiation generating apparatus 101 may have a plurality of modes for controlling generation of radiation. In this case, the control apparatus 103 can directly transmit, to the radiation generating apparatus 101, designation information or a designation instruction which designates one of the plurality of modes. Alternatively, the control apparatus 103 may indirectly transmit, to the radiation generating apparatus 101 via the exposure control apparatus 102, designation information or a designation instruction which designates one of the plurality of modes. During fluoroscopic imaging, the radiation generating apparatus 101 can provide, to the control apparatus 103, at least one of the time series data (waveform) of the tube voltage and the time series data (waveform) of the tube current in the mode designated by the designation information or designation instruction.

The control apparatus 103 can be configured to obtain the radiation generation condition by the radiation generating apparatus 101 during fluoroscopic imaging, and determine, during the fluoroscopic imaging, timings of the plurality of sampling and holding operations in each of a plurality of pixels 20 in a pixel array 106 in accordance with the radiation generation condition. Here, the control apparatus 103 can be configured to determine the timings of the plurality of sampling and holding operations for each frame in fluoroscopic imaging or moving image capturing. The timing of at least one sampling and holding operation of the plurality of sampling and holding operations is a timing in an irradiation period of radiation. As will be described later with reference to FIG. 3, each of the plurality of pixels 20 can include a conversion element 210 configured to convert radiation into an electrical signal, and a sample and hold circuit unit 270 configured to sample and hold signals from the conversion element 210 multiple times. The signal from the conversion element 210 may be an electrical signal converted in the conversion element 210, or may be a signal generated based on the electrical signal. The sample and hold circuit unit 270 can perform the plurality of sampling and holding multiple operations in accordance with the timings of the plurality of sampling and holding operations determined by the control apparatus 103.

In one aspect, the control apparatus 103 can be configured to obtain a radiation generation condition multiple times during fluoroscopic imaging and, each time the radiation generation condition is obtained, determine the timings of the plurality of sampling and holding operations. In another aspect, the control apparatus 103 may include the detection unit 110 that detects a change of the radiation generation condition during fluoroscopic imaging, and the control apparatus 103 can be configured to change, based on an output of the detection unit 110, the timings of the plurality of sampling and holding operations. The detection unit 110 can be configured to detect a change of the radiation generation condition in accordance with an operation of a user interface (not shown) by an operator. Alternatively, the detection unit 110 may be configured to detect a change of the radiation generation condition caused by execution of Auto Brightness Control (ABC). In still another aspect, the control apparatus 103 can continue to monitor the radiation generation condition during fluoroscopic imaging and, in accordance with the latest radiation generation condition, determine the timings of the plurality of sampling and holding operations. The control apparatus 103 can be configured to obtain the radiation generation condition at least in a period from reception of a start instruction requesting to start fluoroscopic imaging to reception of an end instruction requesting to end the fluoroscopic imaging started in accordance with the start instruction.

In one aspect, the timings of the plurality of sampling and holding operations can include a timing of sampling and holding a signal including information of an object. Further, the timings of the plurality of sampling and holding operations can include a timing of sampling and holding a signal not including the information of the object.

The control apparatus 103 may be configured to determine the timings of the plurality of sampling and holding operations, in accordance with a control information set selected from a plurality of control information sets in accordance the radiation generation condition. Alternatively, the control apparatus 103 may generate a control information set corresponding to the latest radiation generation condition based on at least some of a plurality of control information sets respectively associated with a plurality of radiation generation conditions. In this case, the timings of the plurality of sampling and holding operations can be determined based on the generated control information set.

The control apparatus 103 may be configured to obtain the radiation generation condition based on information output from the radiation generating apparatus 101. The information includes, for example, information concerning the tube voltage, and the control apparatus 103 can determine, based on the tube voltage, the timings of the plurality of sampling and holding operations. The information includes, for example, information concerning the tube current, and the control apparatus 103 can determine, based on the tube current, the timings of the plurality of sampling and holding operations.

The timings of the plurality of sampling and holding operations can include, for example, a timing of sampling and holding a signal corresponding to radiation having a first energy and a timing of sampling and holding a signal corresponding to radiation having a second energy. The second energy is an energy different from the first energy. The timings of the plurality of sampling and holding operations can also include a timing of sampling and holding a signal not including information of an object.

The radiation detector 100 can include the plurality of pixels 20 that detect the radiation R. In another aspect, the radiation detector 100 can include the pixel array 106 including the plurality of pixels 20 that detect the radiation R. In an example, the plurality of pixels 20 share a scintillator that converts radiation into visible light, and each pixel 20 can include a conversion element (for example, a photoelectric conversion element such as a photodiode) that converts light converted from radiation by the scintillator into an electrical signal (charges). Such the pixel 20 or conversion element can be called an indirect type pixel or conversion element. In another example, each pixel 20 can include a conversion element (for example, a CdTe or the like) that converts radiation into an electrical signal (charges). Such the pixel 20 or conversion element can be called a direct type pixel or conversion element.

Figure 2:
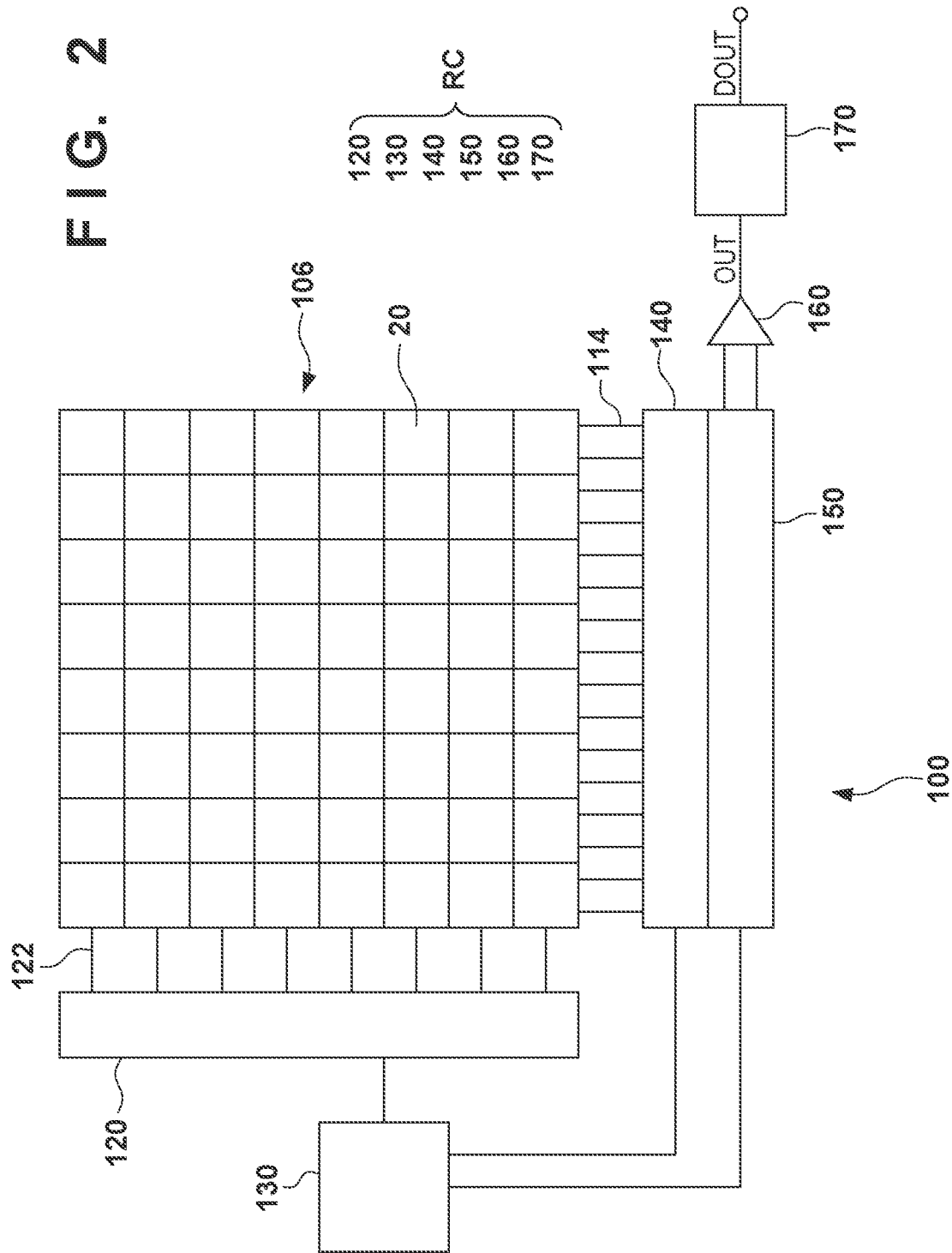
FIG. 2 is a view exemplarily showing the arrangement of a radiation detector common to the first to third embodiments.

FIG. 2 shows an example of the arrangement of the radiation detector 100. The radiation detector 100 includes the pixel array 106 including the plurality of pixels 20, and a read circuit RC configured to read out signals from the plurality of pixels 20 of the pixel array 106. The plurality of pixels 20 can be arrayed so as to form a plurality of rows and a plurality of columns. The read circuit RC can include a row driving circuit 120, a control circuit 130, a buffer circuit 140, a column selection circuit 150, an amplification unit 160, and an AD convertor 170.

The row driving circuit 120 selects at least one row from the plurality of rows of the pixel array 106, and drives the selected row. The row driving circuit 120 can be configured to select a row by driving a row control signal 122. The buffer circuit 140 buffers signals from the pixels 20 of the row selected by the row driving circuit 120 from the plurality of rows of the pixel array 106. The buffer circuit 140 buffers the signals of a plurality of columns output to a plurality of column signal line pairs 114 of the pixel array 106. The column signal line pair 114 of each column includes a first column signal line and a second column signal line (a first column signal line 321 and a second column signal line 322 to be described later), which constitute a column signal line pair. The noise level of the pixel 20 or a radiation signal corresponding to radiation detected in the pixel 20 can be output to the first column signal line. The radiation signal corresponding to radiation detected in the pixel 20 can be output to the second column signal line. The buffer circuit 140 can include an amplification circuit.

The column selection circuit 150 selects, in a predetermined order, signal pairs of one row buffered by the buffer circuit 140. The amplification unit 160 amplifies the signal pairs selected by the column selection circuit 150. Here, the amplification unit 160 can be configured as a differential amplifier that amplifies the difference between the column signal line pair 114 (the first column signal line 321 and the second column signal line 322 to be described later). The AD convertor 170 can include the AD convertor 170 that AD-converts a signal OUT output from the amplification unit 160 and outputs a digital signal DOUT (radiation image signal).

Figure 3:
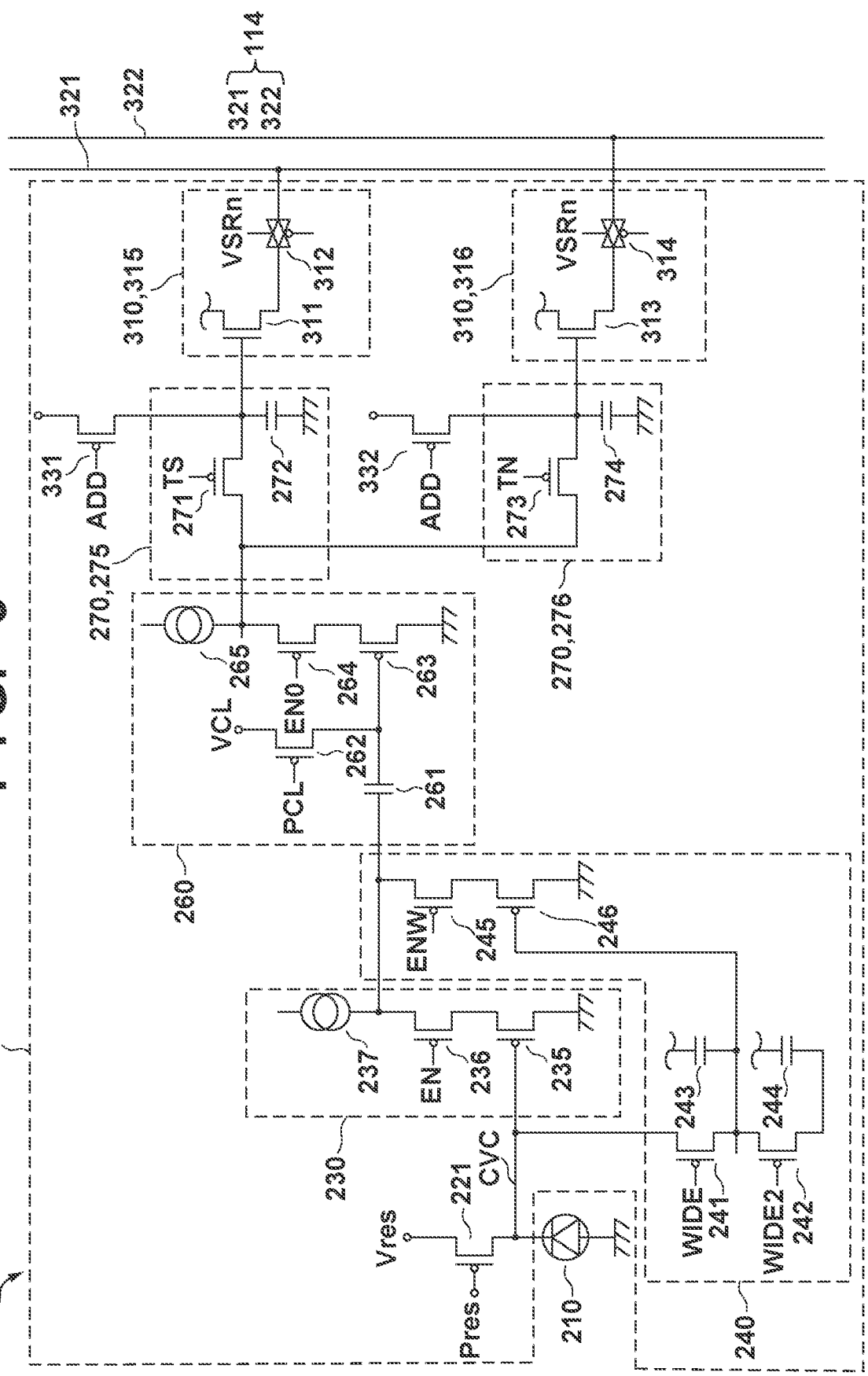
FIG. 3 is a view exemplarily showing an equivalent circuit diagram of an example of the arrangement of a pixel common to the first to third embodiments.

FIG. 3 shows an equivalent circuit diagram of an example of the arrangement of the pixel 20. The pixel 20 can include the conversion element 210 that converts radiation into an electrical signal, and an output circuit 220 that outputs a signal corresponding to the electrical signal converted by the conversion element 210. The output circuit 220 can include, for example, an amplification circuit unit 230, a clamp circuit unit 260, the sample and hold circuit unit 270, and a selection circuit unit 310.

The conversion element 210 includes a charge accumulation portion. The charge accumulation portion can be connected to the gate of a MOS transistor 235 of the amplification circuit unit 230. The source of the MOS transistor 235 can be connected to a current source 237 via a MOS transistor 236. The MOS transistor 235 and the current source 237 can form a source follower circuit. The MOS transistor 236 is an enable switch that is turned on when an enable signal EN supplied to its gate is set at an active level, and sets the source follower circuit in an operation state.

In the example shown in FIG. 2, the charge accumulation portion of the conversion element 210 and the gate of the MOS transistor 235 form a common node, and this node can function as a charge-voltage convertor CVC that converts charges accumulated in the charge accumulation portion into a voltage. That is, a voltage V (=Q/C) determined by charges Q accumulated in the charge accumulation portion and a capacitance value C of the charge-voltage convertor CVC appears in the charge-voltage convertor CVC. The charge-voltage convertor CVC can be connected to a reset potential Vres via a reset switch 221. When a reset signal Pres is driven at an active level by the row driving circuit 120, the reset switch 221 is turned on, and the potential of the charge-voltage convertor CVC and the potential of the charge accumulation portion can be reset to the reset potential Vres.

The clamp circuit unit 260 clamps, by a clamp capacitor 261, noise output from the amplification circuit unit 230 in accordance with the reset potential of the charge-voltage convertor CVC. That is, the clamp circuit unit 260 is a circuit configured to cancel the noise from a signal output from the source follower circuit in accordance with charges (electrical signal) generated by photoelectric conversion in the conversion element 210. The noise can include kTC noise at the time of reset. Clamping is performed by turning on a MOS transistor 262 by setting a clamp signal PCL at an active level, and then turning off the MOS transistor 262 by setting the clamp signal PCL at an inactive level. The output side of the clamp capacitor 261 can be connected to the gate of a MOS transistor 263. The source of the MOS transistor 263 can be connected to a current source 265 via a MOS transistor 264. The MOS transistor 263 and the current source 265 can form a source follower circuit. The MOS transistor 264 is an enable switch that is turned on when an enable signal ENO supplied to its gate is set at an active level, and sets the source follower circuit in an operation state.

The signal output from the clamp circuit unit 260 in accordance with charges converted from radiation in the conversion element 210 can be written, as a radiation signal, in a capacitor 272 via a switch 271 when a first sampling signal TS is driven by the row driving circuit 120. The signal output from the clamp circuit unit 260 when turning on and off the MOS transistor 262 immediately after resetting the potential of the charge-voltage convertor CVC is a noise level. The noise level is written in a capacitor 274 via a switch 273 when a second sampling signal TN is driven by the row driving circuit 120. This noise level includes an offset component of the clamp circuit unit 260. The switch 271 and the capacitor 272 can form a first sample and hold circuit 275, and the switch 273 and the capacitor 274 can form a second sample and hold circuit 276. Accordingly, the sample and hold circuit unit 270 can include the first sample and hold circuit 275 and the second sample and hold circuit 276.

The column signal line pair 114 is constituted by the first column signal line 321 and the second column signal line 322. When the row driving circuit 120 drives a row selection signal VSRn of the nth row to an active level, the radiation signal held in the capacitor 272 of the pixel 20 of the nth row is output to the first column signal line 321 via a MOS transistor 311 and a row selection switch 312. In addition, the noise level or radiation signal held in the capacitor 274 is simultaneously output to the second column signal line 322 via a MOS transistor 313 and a row selection switch 314. The MOS transistor 311 forms a source follower circuit together with a constant current source (not shown) provided on the first column signal line 321. Similarly, the MOS transistor 313 forms a source follower circuit together with a constant current source (not shown) provided on the second column signal line 322. The MOS transistor 311 and the row selection switch 312 form a first selection circuit 315, and the MOS transistor 313 and the row selection switch 314 form a second selection circuit 316. Accordingly, the selection circuit unit 310 includes the first selection circuit 315 and the second selection circuit 316.

The pixel 20 may include an addition switch 331 that adds the radiation signals of the plurality of adjacent pixels 20. In an addition mode, an addition mode signal ADD is driven at an active level, and this can turn on the addition switch 331. This causes the addition switch 331 to interconnect the capacitors 272 of the adjacent pixels 20, and the optical signals can be averaged. Similarly, the pixel 20 may include an addition switch 332 that adds noise levels of the plurality of adjacent pixels 20. In the addition mode, the addition mode signal ADD is driven at the active level, and this can turn on the addition switch 332. This causes the addition switch 332 to interconnect the capacitors 274 of the adjacent pixels 20, and the noise levels can be averaged.

The pixel 20 may include a sensitivity changing unit 240 for changing the sensitivity. The pixel 20 can include, for example, a first sensitivity change switch 241, a second sensitivity change switch 242, and their circuit elements. When a first change signal WIDE is set at an active level, the first sensitivity change switch 241 is turned on to add the capacitance value of a first additional capacitor 243 to the capacitance value of the charge-voltage convertor CVC. This decreases the sensitivity of the pixel 20. When a second change signal WIDE2 is set at an active level, the second sensitivity change switch 242 is turned on to add the capacitance value of a second additional capacitor 244 to the capacitance value of the charge-voltage convertor CVC. This further decreases the sensitivity of the pixel 20. In this way, by adding a function of decreasing the sensitivity of the pixel 20, it is possible to convert a larger amount of radiation into charges and accumulate the charges, thereby widening a dynamic range. When the first change signal WIDE is set at the active level, an enable signal ENW may be set at an active level to cause a MOS transistor 246 to perform a source follower operation instead of the MOS transistor 235.

Figure 4:
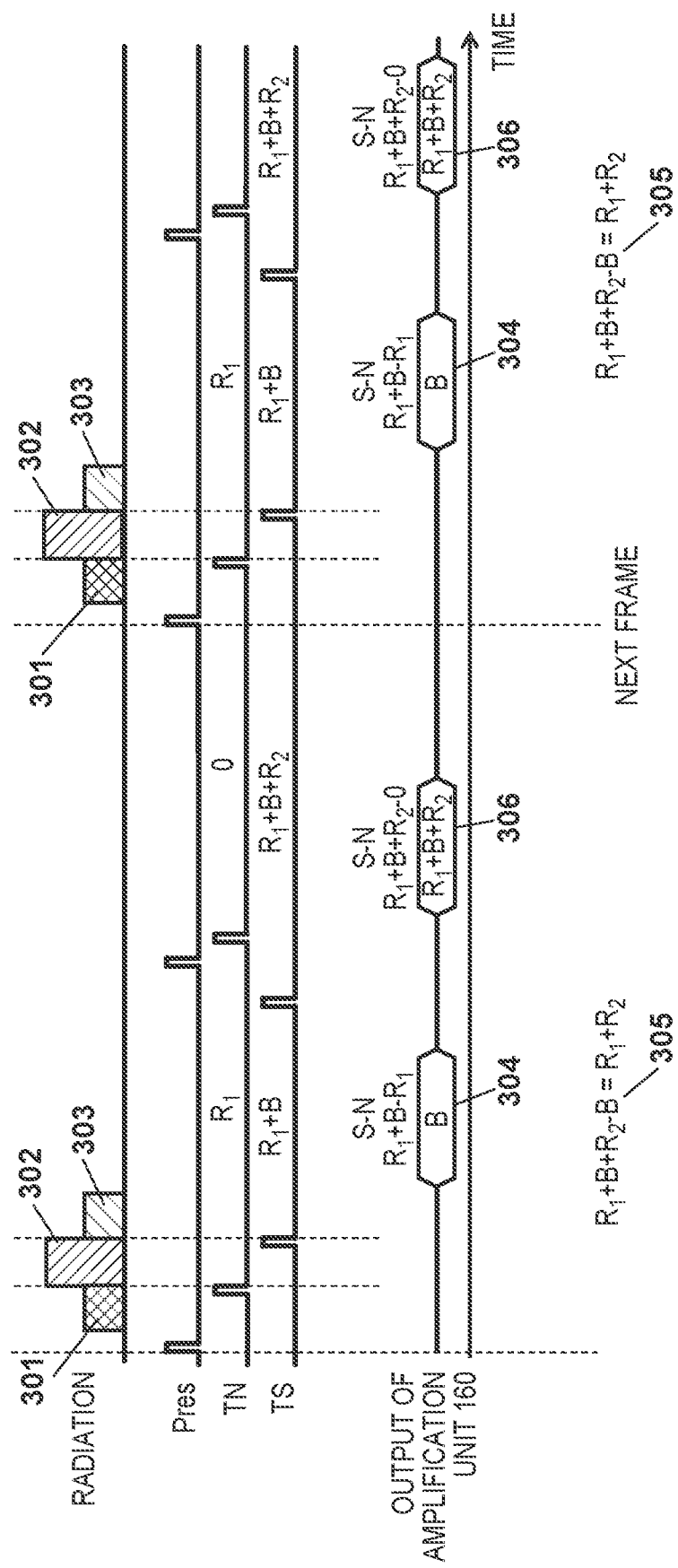
FIG. 4 is a timing chart exemplarily showing the driving timings upon operating the radiation imaging system in a basic mode of energy subtraction driving.

Next, the driving method or control method of the radiation imaging system 1 in fluoroscopic imaging will be described. FIG. 4 exemplarily shows the driving timings upon operating the radiation imaging system 1 in a basic mode of energy subtraction driving. In FIG. 4, the abscissa represents the time axis, and FIG. 4 shows the radiation R, the reset signal Pres, the first sampling signal TS, the second sampling signal TN, and the output of the amplification unit 160. Here, the output of the amplification unit 160 is a signal obtained by amplifying the difference between the first column signal line 321 and the second column signal line 322 constituting the column signal line 114, that is, the difference between the radiation signal and the noise level (or radiation signal). The timings of completing the sampling and holding operations by the first sampling signal TS and the second sampling signal TN are an example of a plurality of timings generated by the row driving circuit 120 for each frame of fluoroscopic imaging or moving image capturing. For example, the plurality of timings can be determined by the control apparatus 103 in accordance with the radiation generation condition. The control apparatus 103 can be configured to obtain the radiation generation condition which is given during fluoroscopic imaging or moving image capturing, and determine timings of the plurality of sampling and holding operations in each of the plurality of pixels 20 in accordance with the radiation generation condition. Here, the timing of at least one sampling and holding operation of the plurality of sampling and holding operations can be a timing in an irradiation period of radiation.

The control apparatus 103 can give, to the control circuit 130, a timing signal for instructing the plurality of timings, and the control apparatus 103 can generate, in the row driving circuit 120, a plurality of timing signals in accordance with the timing signal. Alternatively, the control apparatus 103, the control circuit 130, or the row driving circuit 120 may store a plurality of control information sets. In this case, the timings of the plurality of sampling and holding can be determined in accordance with a control information set selected from the plurality of control information sets in accordance with the radiation generation condition.

In the example shown in FIG. 4, first, after the reset signal Pres is set at an active level for a predetermined period to reset the conversion element 210, the radiation generating apparatus 101 performs irradiation (exposure) of low energy radiation 301 (corresponding to the radiation R). Then, by setting the second sampling signal TN at the active level and then at the inactive level, the second sample and hold circuit 276 performs sampling and holding. $R_1$ attached to the row of the second sampling signal TN indicates the signal sampled and held by the second sample and hold circuit 276 (the signal corresponding to the low energy radiation 301). Note that the charges accumulated in the charge accumulation portion of the conversion element 210 and the charge-voltage convertor CVC at the time of completion of the sampling and holding by the second sampling signal TN are charges corresponding to the dose of the low energy radiation 301.

Then, the tube voltage is switched, and the radiation generating apparatus 101 performs irradiation of high energy radiation 302. Then, by setting the first sampling signal TS at the active level and then at the inactive level, the first sample and hold circuit 275 performs sampling and holding. $R_1$ and B attached to the row of the first sampling signal TS indicate the signals sampled and held by the first sample and hold circuit 275 (the signal corresponding to the low energy radiation 301+the signal corresponding to the high energy radiation 302). Note that the charges accumulated in the charge accumulation portion of the conversion element 210 and the charge-voltage convertor CVC at the time of completion of the sampling and holding by the first sampling signal TS are charges corresponding to the sum of the dose of the radiation 301 and the dose of the radiation 302.

Then, the tube voltage is switched, and the radiation generating apparatus 101 performs irradiation of low energy radiation 303. Further, the read circuit RC reads out, from the pixel array 106 via the plurality of column signal line pairs 114, an image 304 from the first sample and hold circuit 275 and the second sample and hold circuit 276. At this time, the amplification unit 160 outputs, as the image 304, a signal obtained by amplifying the difference between the first column signal line 321 and the second column signal line 322, which constitute the column signal line pair 114. Accordingly, the signal or image 304 output from the amplification unit 160 corresponds to the difference B between the signal $R_1$+B output to the first column signal line 321 and the signal $R_1$ output to the second column signal line 322.

After the irradiation of the low energy radiation 303 and the readout of the image 304 are complete, the first sample and hold circuit 275 performs sampling and holding again. $R_1$, B, and $R_2$ attached to the row of the first sampling signal TS indicate the signals sampled and held by the first sample and hold circuit 275 (the signal corresponding to the radiation 301+the signal corresponding to the radiation 302+the signal corresponding to the radiation 303). Note that the charges accumulated in the charge accumulation portion of the conversion element 210 and the charge-voltage convertor CVC at the time of completion of the second sampling and holding by the first sampling signal TS are charges corresponding to the sum of the dose of the radiation 301, the dose of the radiation 302, and the dose of the radiation 303.

Then, the reset signal Pres is set at the active level for the predetermined period again to reset the conversion element 210. After this, by setting the second sampling signal TN at the active level and then at the inactive level again, the second sample and hold circuit 276 performs sampling and holding of the noise level. 0 attached to the row of the second sampling signal TN indicates the noise level sampled and held by the second sample and hold circuit 276. At this time, the second sample and hold circuit 276 holds a signal in a state in which irradiation of radiation is not performed. On the other hand, the first sample and hold circuit 275 holds a signal corresponding to the sum of the dose of the radiation 301, the dose of the radiation 302, and the dose of the radiation 303 ($R_1$, B, and $R_2$).

Subsequently, the read circuit RC reads out, from the pixel array 106 via the plurality of column signal line pairs 114, the image 306 from the first sample and hold circuit 275 and the second sample and hold circuit 276. At this time, the amplification unit 160 outputs, as the image 306, a signal obtained by amplifying the difference between the first column signal line 321 and the second column signal line 322, which constitute the column signal line pair 114. Accordingly, the signal or image 306 output from the amplification unit 160 corresponds to the difference $R_1$+B+$R_2$ between the signal $R_1$+B+$R_2$+0 (0 indicates the noise level) output to the first column signal line 321 and the noise level 0 output to the second column signal line 322.

The control apparatus 103 can obtain the image 305 corresponding to the sum of the low energy radiation 301 and the low energy radiation 303 by calculating the difference between the image 306 and the image 304.

Thus, imaging of one frame in fluoroscopic imaging ends. If the radiation generation condition is not changed during the frame, imaging of the next frame is performed using the same timings as those of the first sampling signal TS and the second sampling signal TN in the frame.

Here, the timing of sampling and holding is a relative timing with a periodic reference signal as a reference. In the example described above, the timing of the sampling and holding operation is a relative timing with the reset signal Pres (first activation in the frame), which is the signal for resetting the conversion element 210, as the reference. The periodic reference signal may be, for example, the above-described exposure permission signal, a signal in synchronization with the exposure permission signal (in this case, the conversion element 210 is reset before exposure), or a signal for generating the exposure permission signal. The timing of the sampling and holding operation can be understood as the timing of transition of each of the first and second sampling signals from the active level to the inactive level. However, if the active period is fixed, the timing of transition of each of the first and second sampling signals from the inactive level to the active level is also determined based on the timing of transition of each of the first and the second sampling signals from the active level to the inactive level. Hence, the timing of the sampling and holding operation may be understood as the timing of transition of each of the first and second sampling signals from the inactive level to the active level.

Figure 5:
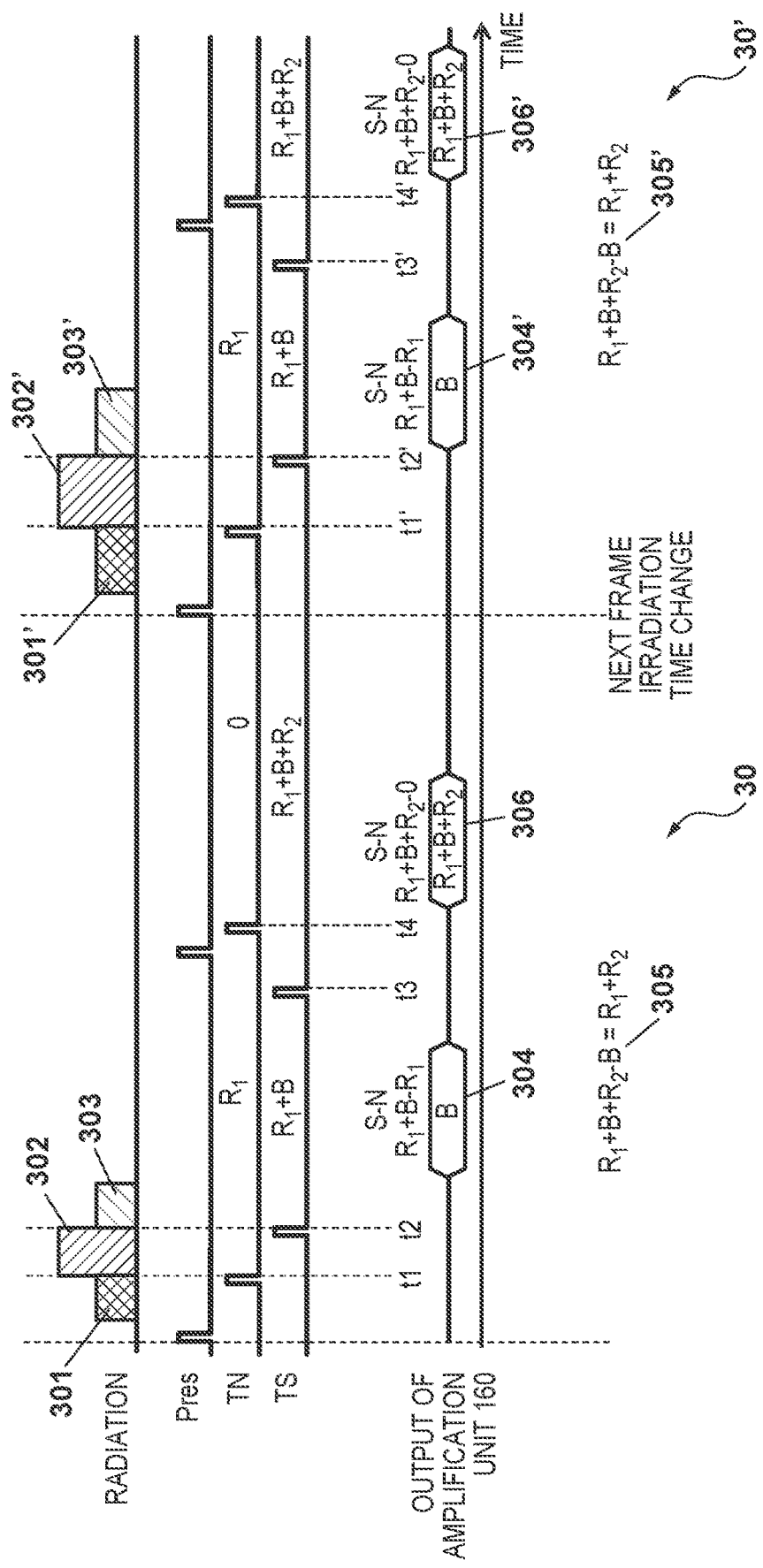
FIG. 5 is a timing chart exemplarily showing the operation of the radiation imaging system or a radiation imaging apparatus according to the first embodiment.

Next, the driving method or control method of the radiation imaging system 1 in a case in which the radiation generation condition is changed during fluoroscopic imaging will be described. FIG. 5 exemplarily shows the driving timings upon operating the radiation imaging system 1 in a following mode of energy subtraction driving. The notation in FIG. 5 follows the notation in FIG. 4. FIG. 5 exemplarily shows a frame 30 before changing the radiation irradiation time and a frame 30' after changing the radiation irradiation time. Radiation 301' indicates low energy radiation after changing the irradiation time, radiation 302' indicates high energy radiation after changing the irradiation time, and radiation 303' indicates low energy radiation after changing the irradiation time. The following mode shown in FIG. 5 is different from the basic mode shown in FIG. 4 in that the timing of the sampling and holding operation is changed in accordance with the change of the radiation irradiation time. Here, the timing of the sampling and holding operation in accordance with each of the first sampling signal TS and the second sampling signal TN can be changed by the control circuit 130 controlling the row driving circuit 120 in accordance with an instruction from the control apparatus 103.

First, the operation in the frame 30 will be described. After the reset signal Pres serving as the reference signal is set at the active level for the predetermined period to reset the conversion element 210, the radiation generating apparatus 101 performs irradiation (exposure) of the low energy radiation 301 (radiation R). Then, the second sampling signal TN is set at the active level, and then returned to the inactive level at a first timing t1, thereby completing the sampling and holding operation by the second sample and hold circuit 276. The timing of completion of the sampling and holding operation is the timing of return of the second sampling signal TN from the active level to the inactive level. The charges accumulated in the charge accumulation portion of the conversion element 210 and the charge-voltage convertor CVC at the first timing t1 are charges corresponding to the dose of the low energy radiation 301.

Then, the tube voltage is switched, and the radiation generating apparatus 101 performs irradiation (exposure) of the high energy radiation 302 (radiation R). Then, the first sampling signal TS is set at the active level and then returned to the inactive level at a second timing t2, thereby completing the sampling and holding operation by the first sample and hold circuit 275. The charges accumulated in the charge accumulation portion of the conversion element 210 and the charge-voltage convertor CVC at the second timing t2 are charges corresponding to the sum of the dose of the radiation 301 and the dose of the radiation 302.

Then, the tube voltage is switched, and the radiation generating apparatus 101 performs irradiation (exposure) of the low energy radiation 303 (radiation R). Further, the read circuit RC reads out, from the pixel array 106 via the plurality of column signal line pairs 114, the image 304 from the first sample and hold circuit 275 and the second sample and hold circuit 276. At this time, the amplification unit 160 outputs, as the image 304, a signal obtained by amplifying the difference between the first column signal line 321 and the second column signal line 322, which constitute the column signal line pair 114. Accordingly, the signal or image 304 output from the amplification unit 160 corresponds to the difference B between the signal $R_1$+B output to the first column signal line 321 and the signal $R_1$ output to the second column signal line 322.

After the irradiation of the low energy radiation 303 and the readout of the image 304 are complete, the first sampling signal TS is set at the active level and then returned to the inactive level at a third timing t3, thereby completing the sampling and holding operation by the first sample and hold circuit 275. The charges accumulated in the charge accumulation portion of the conversion element 210 and the charge-voltage convertor CVC at the third timing t3 are charges corresponding to the sum of the dose of the radiation 301, the dose of the radiation 302, and the dose of the radiation 303.

Then, the reset signal Pres is set at the active level for the predetermined period again to reset the conversion element 210. After this, the second sampling signal TN is set at the active level and then returned to the inactive level at a fourth timing t4, thereby completing the sampling and holding operation of the noise level by the second sample and hold circuit 276. At this time, the second sample and hold circuit 276 holds a signal in a state in which irradiation of radiation is not performed. On the other hand, the first sample and hold circuit 275 holds a signal corresponding to the sum of the dose of the radiation 301, the dose of the radiation 302, and the dose of the radiation 303 ($R_1$, B, and $R_2$).

Subsequently, the read circuit RC reads out, from the pixel array 106 via the plurality of column signal line pairs 114, the image 306 from the first sample and hold circuit 275 and the second sample and hold circuit 276. At this time, the amplification unit 160 outputs, as the image 306, a signal obtained by amplifying the difference between the first column signal line 321 and the second column signal line 322, which constitute the column signal line pair 114. Accordingly, the signal or image 306 output from the amplification unit 160 corresponds to the difference $R_1$+B+$R_2$ between the signal $R_1$+B+$R_2$+0 (0 indicates the noise level) output to the first column signal line 321 and the noise level 0 output to the second column signal line 322.

The control apparatus 103 can obtain the image 305 corresponding to the sum of the low energy radiation 301 and the low energy radiation 303 by calculating the difference between the image 306 and the image 304. Thus, imaging of the frame 30 in fluoroscopic imaging ends.

In this example, the radiation generation condition (irradiation time) is changed during the period of the frame 30, and the control apparatus 103 changes the first timing t1, the second timing t2, the third timing t3, and the fourth timing t4 to a first timing t1', a second timing t2', a third timing t3', and a fourth timing t4', respectively, in accordance with the change. Here, the timing is a relative timing with a periodic reference signal as a reference. In the example described above, the timing is a relative timing with the reset signal Pres (first activation in the frame), which is the signal for resetting the conversion element 210, as the reference. The periodic reference signal may be, for example, the above-described exposure permission signal, a signal in synchronization with the exposure permission signal (in this case, the conversion element 210 is reset before exposure), or a signal for generating the exposure permission signal.

The operation in the frame 30' after changing the irradiation time as an example of the radiation generation condition will be described below. After the reset signal Pres serving as the reference signal is set at the active level for the predetermined period to reset the conversion element 210, the radiation generating apparatus 101 performs irradiation of the low energy radiation 301'. Then, the second sampling signal TN is set at the active level, and then returned to the inactive level at a first timing t1', thereby completing the sampling and holding operation by the second sample and hold circuit 276. The charges accumulated in the charge accumulation portion of the conversion element 210 and the charge-voltage convertor CVC at the first timing t1 are charges corresponding to the dose of the low energy radiation 301'.

Then, the tube voltage is switched, and the radiation generating apparatus 101 performs irradiation (exposure) of the high energy radiation 302' (radiation R). Then, the first sampling signal TS is set at the active level and then returned to the inactive level at a second timing t2', thereby completing the sampling and holding operation by the first sample and hold circuit 275. The charges accumulated in the charge accumulation portion of the conversion element 210 and the charge-voltage convertor CVC at the second timing t2' are charges corresponding to the sum of the dose of the radiation 301 and the dose of the radiation 302'.

Then, the tube voltage is switched, and the radiation generating apparatus 101 performs irradiation of the low energy radiation 303'. Further, the read circuit RC reads out, from the pixel array 106 via the plurality of column signal line pairs 114, an image 304' from the first sample and hold circuit 275 and the second sample and hold circuit 276. At this time, the amplification unit 160 outputs, as the image 304', a signal obtained by amplifying the difference between the first column signal line 321 and the second column signal line 322, which constitute the column signal line pair 114. Accordingly, the signal or image 304' output from the amplification unit 160 corresponds to the difference B between the signal $R_1+B$ output to the first column signal line 321 and the signal $R_1$ output to the second column signal line 322.

After the irradiation of the low energy radiation 303' and the readout of the image 304' are complete, the first sampling signal TS is set at the active level and then returned to the inactive level at a third timing t3', thereby completing the sampling and holding operation by the first sample and hold circuit 275. The charges accumulated in the charge accumulation portion of the conversion element 210 and the charge-voltage convertor CVC at the third timing t3' are charges corresponding to the sum of the dose of the radiation 301', the dose of the radiation 302', and the dose of the radiation 303'.

Then, the reset signal Pres is set at the active level for the predetermined period again to reset the conversion element 210. After this, the second sampling signal TN is set at the active level and then returned to the inactive level at a fourth timing t4', thereby completing the sampling and holding operation of the noise level by the second sample and hold circuit 276. At this time, the second sample and hold circuit 276 holds a signal in a state in which irradiation of radiation is not performed. On the other hand, the first sample and hold circuit 275 holds a signal corresponding to the sum of the dose of the radiation 301', the dose of the radiation 302', and the dose of the radiation 303' ($R_1$, B, and $R_2$).

Subsequently, the read circuit RC reads out, from the pixel array 106 via the plurality of column signal line pairs 114, an image 306' from the first sample and hold circuit 275 and the second sample and hold circuit 276. At this time, the amplification unit 160 outputs, as the image 306', a signal obtained by amplifying the difference between the first column signal line 321 and the second column signal line 322, which constitute the column signal line pair 114. Accordingly, the signal or image 306' output from the amplification unit 160 corresponds to the difference $R_1+B+R_2$ between the signal $R_1+B+R_2+0$ (0 indicates the noise level) output to the first column signal line 321 and the noise level 0 output to the second column signal line 322.

The control apparatus 103 can obtain an image 305' corresponding to the sum of the low energy radiation 301' and the low energy radiation 303' by calculating the difference between the image 306' and the image 304'. Thus, imaging of the frame 30' in fluoroscopic imaging ends.

A plurality of timings in each frame such as the timings t1, t2, t3, and t4 in the frame 30 and the timings t1', t2', t3', and t4' in the frame 30' can be determined in advance in accordance with the irradiation time serving as the radiation generation condition. For example, the first timing t1, the second timing t2, the third timing t3, and the fourth timing t4 can be defined in the first control information set associated with the first radiation generation condition which is employed in the first frame 30. In accordance with the first control information set associated with the first radiation generation information, the control apparatus 103 can determine the first timing t1, the second timing t2, the third timing t3, and the fourth timing t4 for the first frame 30. In addition, the first timing t1', the second timing t2', the third timing t3', and the fourth timing t4' can be defined in the second control information set associated with the second radiation generation condition which is employed in the second frame 30'. In accordance the second control information set associated with the second radiation generation information, the control apparatus 103 can determine the first timing t1', the second timing t2', the third timing t3', and the fourth timing t4' for the second frame 30'. Alternatively, the control apparatus 103 may generate a control information set corresponding to the latest radiation generation condition based on at least some of a plurality of control information sets respectively associated with a plurality of radiation generation conditions, for example, by interpolation.

In the example described above, the control apparatus 103 changes the first timing t1, the second timing t2, the third timing t3, and the fourth timing t4 to the first timing t1', the second timing t2', the third timing t3', and the fourth timing t4', respectively, in accordance with the change of the radiation generation condition. However, the control apparatus 103 may be configured to change at least one of the plurality of timings in accordance with the change of the radiation generation condition. For example, the control apparatus 103 changes the first and second timings t1 and t2 to the first and second timings t1' and t2', respectively, in accordance with the change of the radiation generation condition. The plurality of timings associated with the radiation generation condition can be determined in advance by, for example, performing measurement or a simulation.

Figure 6:
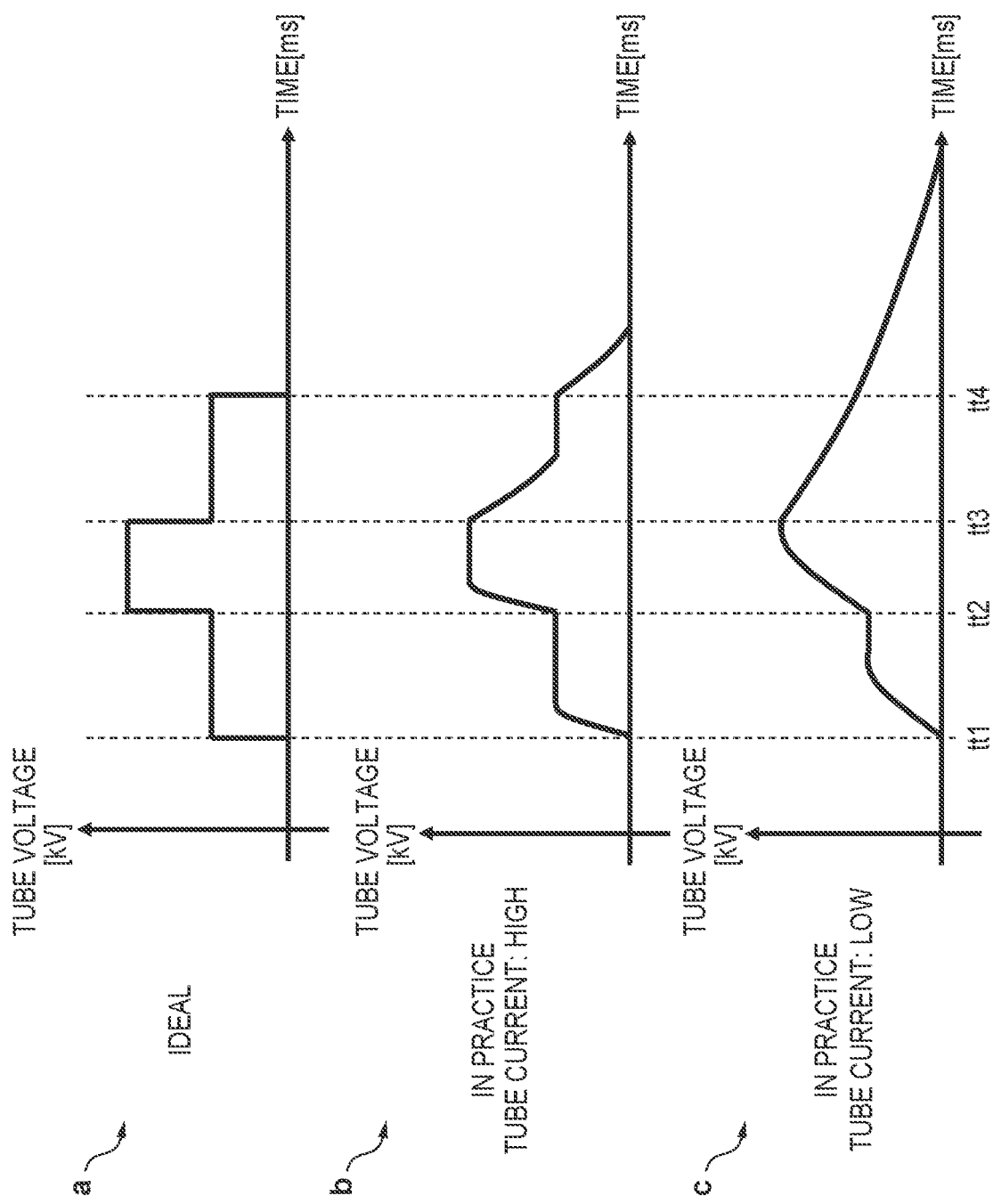
FIG. 6 is a view exemplarily showing the waveforms of tube voltages in one frame.

FIG. 6 exemplarily shows the waveform of the tube voltage which is a voltage applied between the cathode and the anode of the radiation generating apparatus 101. The radiation generating apparatus 101 generates radiation having an energy corresponding to the tube voltage. If the waveform of the tube voltage has a convex shape, the waveform of the energy of radiation generated by applying the tube voltage also has a convex shape. Ideally, the waveform of the tube voltage can have a shape in which the tube voltage sharply rises at time tt2, then maintains a constant value until time tt3, and sharply drops at time tt3 as exemplarily shown a in FIG. 6. However, even if it is tried to implement such the waveform, in practice, the tube voltage can moderately change as exemplarily shown in b and c in FIG. 6. The higher the tube current, the sharper the rise and fall of the tube voltage, and the lower the tube current, the more moderate the rise and fall of the tube voltage. Therefore, even in a case in which the irradiation time is kept constant, if the tube current is changed, it is necessary to change the above-described plurality of timings, for example, the first to fourth timings.

Figure 7:
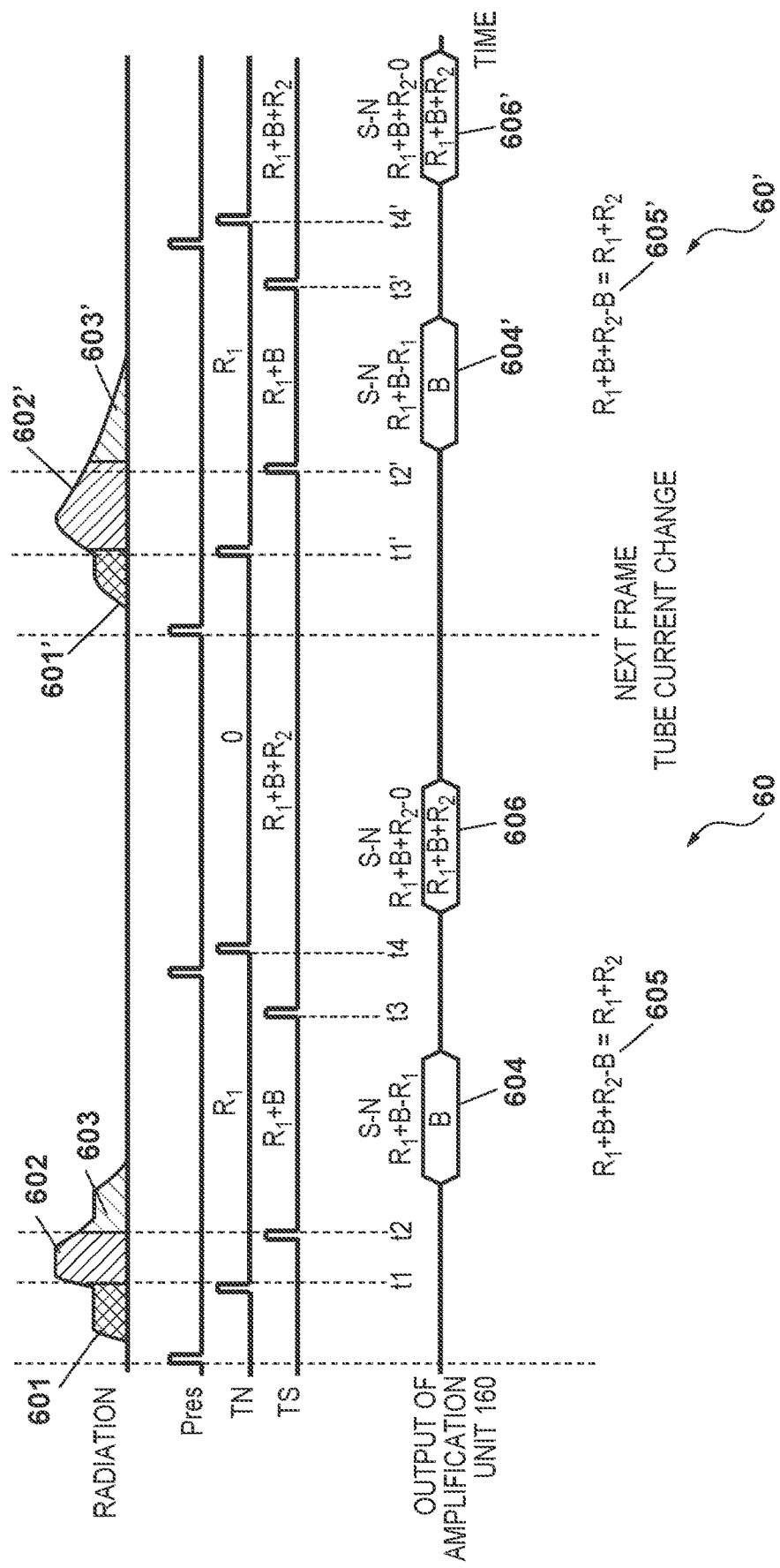
FIG. 7 is a timing chart exemplarily showing the operation of the radiation imaging system or the radiation imaging apparatus according to the first embodiment.

FIG. 7 exemplarily shows the driving timings upon operating the radiation imaging system 1 in the following mode of energy subtraction driving in a case in which the tube current is changed as an example of the radiation generation condition during fluoroscopic imaging. The notation in FIG. 7 follows the notation in FIG. 4. FIG. 7 exemplarily shows a frame 60 before changing the radiation irradiation time and a frame 60' after changing the radiation irradiation time. FIG. 7 exemplarily shows the frame 60 before changing the tube current and a frame 60' after changing the tube current. Radiation 601 indicates low energy radiation before changing the tube current, radiation 602 indicates high energy radiation before changing the tube current, and radiation 603 indicates low energy radiation before changing the tube current. Radiation 601' indicates low energy radiation after changing the tube current, radiation 602' indicates high energy radiation after changing the tube current, and radiation 603' indicates low energy radiation after changing the tube current.

The following mode shown in FIG. 7 is different from the basic mode shown in FIG. 4 in that the timing of the sampling and holding operation is changed in accordance with the change of the tube current. Here, the timing of the sampling and holding operation in accordance with each of the first sampling signal TS and the second sampling signal TN can be changed by the control circuit 130 controlling the row driving circuit 120 in accordance with an instruction from the control apparatus 103.

FIGS. 8A and 8B exemplarily show the first timing and the second timing, respectively. The first timing is shown as the time from the first rise timing of the reset pulse in the frame to the first timing, and the second timing is shown as the time from the first rise timing of the reset pulse in the frame to the second timing. As exemplarily shown in FIGS. 8A and 8B, if the irradiation time is the same, the higher the tube current, the sharper the rise and fall of the voltage. Accordingly, the first and second timings become earlier. For example, in a case in which the setting of the irradiation time is 16 ms, and the setting of the tube current is changed from 100 mA to 160 mA during fluoroscopic imaging, the first timing can be changed from 6.9 ms to 6.3 ms, and the second timing can be changed from 12.4 ms to 11.2 ms. To the contrary, if the tube current is decreased, since the rise and fall of the voltage become moderate, the first timing and the second timing become slower as exemplarily shown in FIGS. 8A and 8B. For example, in a case in which the setting of the irradiation time is 12 ms and the setting of the tube current is changed from 125 mA to 80 mA during fluoroscopic imaging, the first timing can be changed from 5.2 ms to 5.6 ms, and the second timing can be changed from 9.2 ms to 9.9 ms.

The tables (control information) exemplarily shown in FIGS. 8A and 8B can be stored in advance in, for example, a memory in the control apparatus 103 or a memory accessibly by the control apparatus 103. The control apparatus 103 can determine the first timing and the second timing based on the control information. The tables referred to determine the plurality of timings are not limited to the tables exemplarily shown in FIGS. 8A and 8B. For example, the number of combinations of the tube current and the irradiation time may be larger or smaller than that exemplarily shown in FIGS. 8A and 8B. The tables referred to determine the plurality of timings may be provided for each tube voltage or for each waveform of the tube voltage. The example shown in each of FIGS. 8A and 8B can be understood as a two-dimensional table that provides multiple timings with the tube current and the irradiation time as parameters. By referring to the two-dimensional tables as described above, even if the tube current and the irradiation time are simultaneously changed, the control apparatus 103 can determine the plurality of timings in accordance with the changes. Further, if the tube current and the irradiation time not described in the tables exemplarily shown in FIGS. 8A and 8B are set, the plurality of timings corresponding to the set tube current and irradiation time may be determined by interpolating the plurality of timings described in the tables.

The control apparatus 103 may constantly monitor a change in setting of the radiation generation condition during fluoroscopic imaging, and determine and set the plurality of timings corresponding to the latest radiation generation condition. Further, the control apparatus 103 may monitor a change in setting of the radiation generation condition in fluoroscopic imaging and, only if a change occurs, determine and set the plurality of timings corresponding to the changed radiation generation condition. Furthermore, if the radiation generation condition is changed due to execution of Auto Brightness Control (ABC), the control apparatus 103 may determine and set the plurality of timings corresponding to the changed radiation generation condition.

By performing subtraction processing of the image corresponding to the radiation of the first energy and the image corresponding to the radiation of the second energy, a bone image and a soft tissue image can be generated. A bone image and a soft tissue image may also be generated by, for example, solving a nonlinear system of equations generated based on the image corresponding to the radiation of the first energy and the image corresponding to the radiation of the second energy. A contrast agent image and a soft tissue image may be generated. Further, an electron density image and an effective atomic number image may be generated. The disclosed technique may be applied to an industrial radiation imaging system used for inspection of a semiconductor substrate or the like.

A radiation imaging system 1 according to the second embodiment will be described below. Note that matters not mentioned as the second embodiment can follow the first embodiment. In the second embodiment, in addition to changing the timing of the sampling and holding operation during capturing an object image, the timing of the sampling and holding operation during capturing an offset image is changed. In the second embodiment, the configuration will be described in which the sample and hold signal TS in the first embodiment is replaced with sample and hold signals TS1 and TS2 of two systems.

Figure 9:
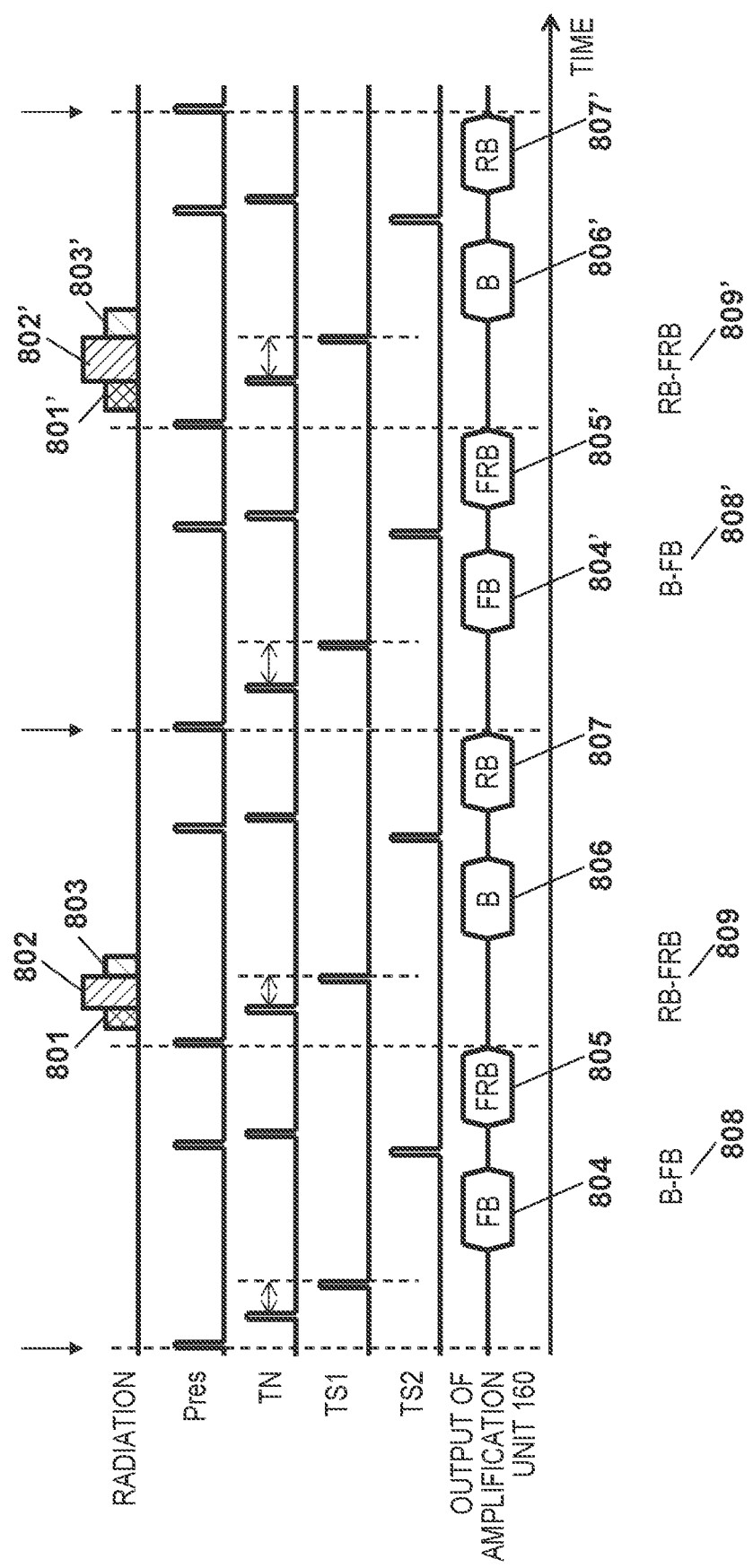
FIG. 9 is a timing chart exemplarily showing the operation of the radiation imaging system or a radiation imaging apparatus according to the second embodiment.

FIG. 9 exemplarily shows the driving timings upon operating the radiation imaging system 1 in a following mode of energy subtraction driving. In the example shown in FIG. 9, the irradiation time is changed as the radiation generation condition during fluoroscopic imaging. An offset signal can be superimposed on the image 304, the image 305, the image 306, and the like shown in FIGS. 4 and 5.

In the radiation imaging system 1 according to the second embodiment, an offset image is obtained to remove the offset signal, and the offset image is subtracted from the object image. The offset signal can change depending on the sampling time. Hence, if the sampling time changes between the object image and the offset image, the offset signal cannot be accurately subtracted from the object image, and image discomfort such as a grid pattern or a linear pattern can be generated in the object image after subtraction. In the second embodiment, by setting the same sampling time for the object image capturing and for the offset image capturing, the offset signal is accurately subtracted from the object image.

As exemplarily shown in FIG. 9, in the second embodiment, a radiation imaging apparatus 10 obtains offset images 804 and 805 immediately before object imaging during fluoroscopic imaging at the same timings as in the object imaging but without performing irradiation of radiation. After that, the radiation imaging apparatus 10 performs irradiation of radiation, and obtains object images 806 and 807. Each of the offset image 804 and the object image 806 is an image corresponding to the difference between the signal sampled and held by the first timing signal TS1 and the signal sampled and held by a second timing signal TN. Each of the offset image 805 and the object image 807 corresponds to the difference between the signal sampled and held by the first timing signal TS2 and the signal sampled and held by the second timing signal TN. A control apparatus 103 can generate an image 808 by subtracting the image 804 from the image 806. The control apparatus 103 can also generate an image 809 by subtracting the image 805 from the image 807.

If the irradiation time is changed during fluoroscopic imaging, as exemplarily shown in FIG. 9, the sampling and holding operation is performed in accordance with the second timing signal TN and the first timing signals TS1 and TS2 controlled by the timings corresponding to the setting of the changed irradiation time. First, the radiation imaging apparatus 10 obtains offset images 804' and 805' in a state in which irradiation of radiation is not performed. After that, the radiation imaging apparatus 10 obtains object images 806' and 807' in a state in which irradiation of radiation is performed. Then, the control apparatus 103 generates an image 808' by subtracting the image 804' from the image 806'. The control apparatus 103 also generates an image 809' by subtracting the image 805' from the image 807'. With the processing described above, even if the irradiation time is changed, it is possible to remove the offset signal from the object image using the offset image obtained at the same sampling time as in object imaging.

Figure 10:
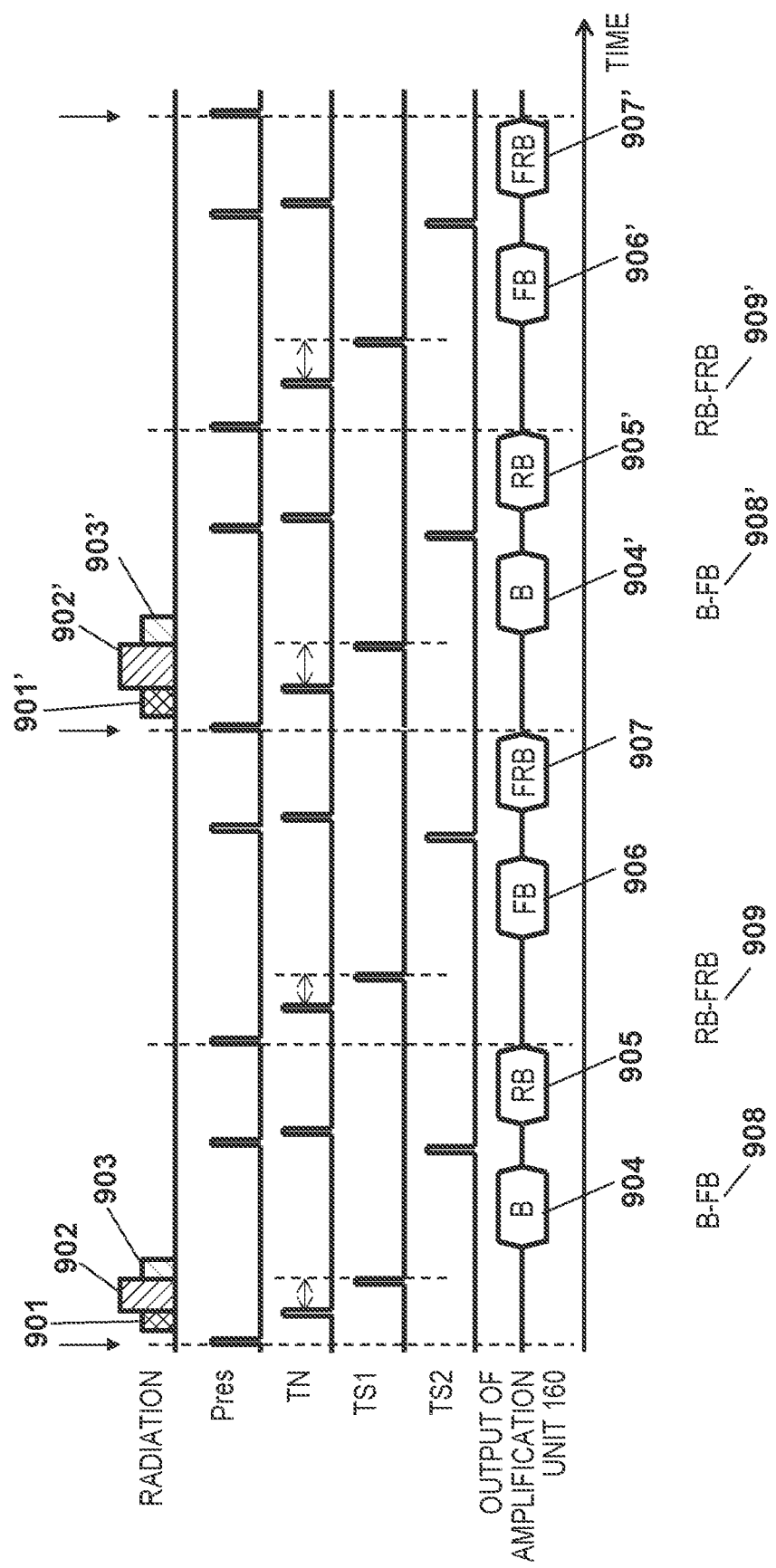
FIG. 10 is a timing chart exemplarily showing the operation of the radiation imaging system or the radiation imaging apparatus according to the second embodiment.

As exemplarily shown in FIG. 10, the offset image may be obtained after the object image is obtained. Here, each of images 904 and 906 is an image corresponding to the difference between the signal sampled and held by the first timing signal TS1 and the signal sampled and held by the second timing signal TN. Each of images 905 and 907 corresponds to the difference between the signal sampled and held by the first timing signal TS2 and the signal sampled and held by the second timing signal TN.

Figure 11:
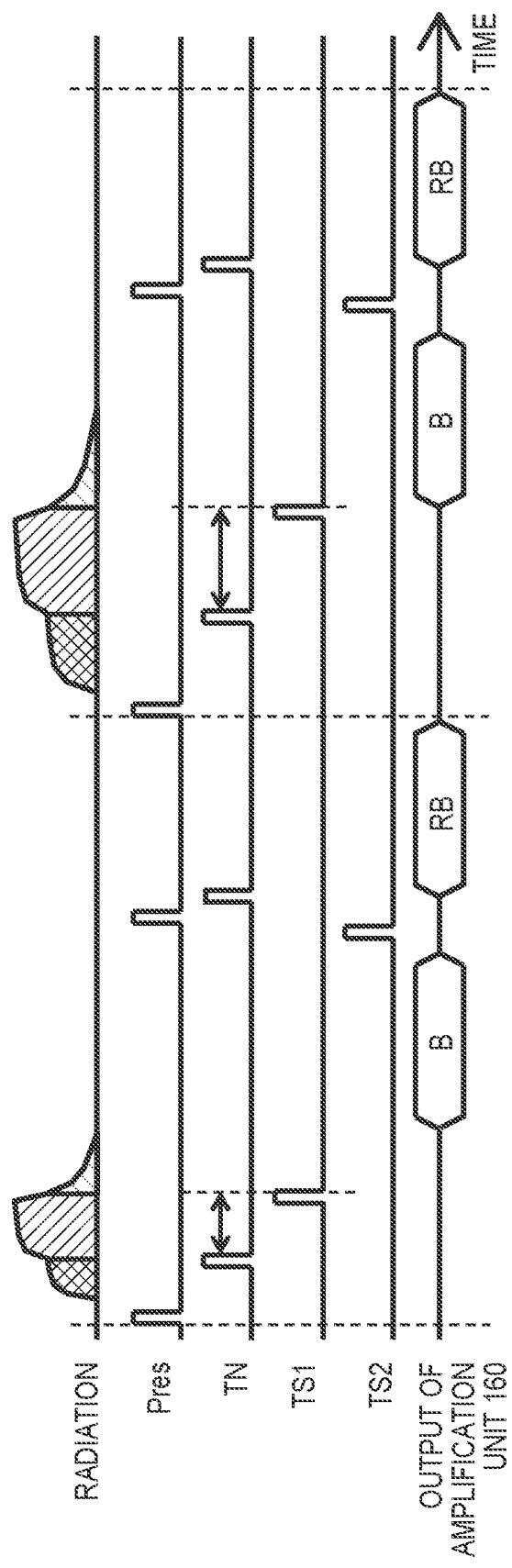
FIG. 11 is a timing chart exemplarily showing the operation of the radiation imaging system or the radiation imaging apparatus according to the second embodiment.

In the first embodiment and the second embodiment, in accordance with the convex-shaped waveform of the tube voltage including radiation irradiation with the low tube voltage, radiation irradiation with the high tube voltage, and radiation irradiation with the low tube voltage, the image including the radiation information of the high tube voltage in the central portion and the image including the radiation information of the low tube voltage in the front and rear portions are generated. However, this is merely an example. For example, as exemplarily shown in FIG. 11, irradiation of radiation may be performed in two stages in the order of the low tube voltage and the high tube voltage, and an image including the radiation information of the high tube voltage and an image including the radiation information of the low tube voltage in the former stage and the radiation information of the wave tail after the high tube voltage may be generated. The timing of the sampling and holding operation may be determined by the method described in the first embodiment in accordance with mA setting and ms setting of radiation. Also in this case, the offset signal can be removed in accordance with the method shown in FIGS. 9 and 10.

Figure 12:
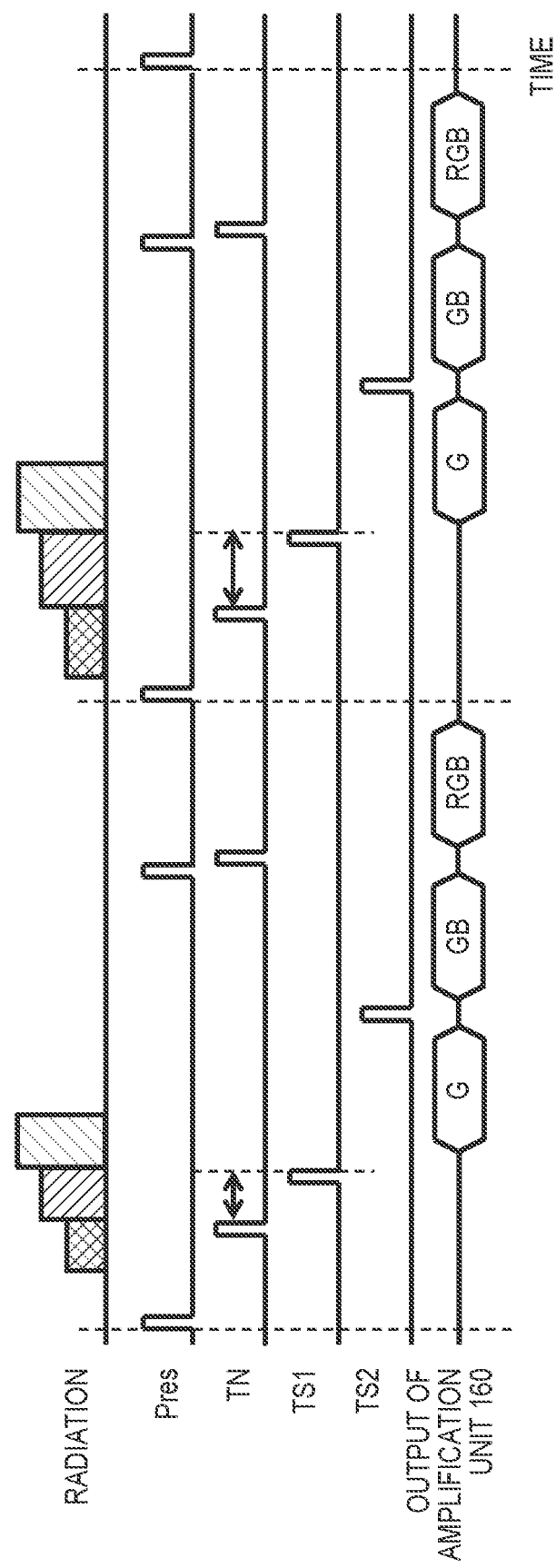
FIG. 12 is a timing chart exemplarily showing the operation of the radiation imaging system or the radiation imaging apparatus according to the second embodiment.

Further, in the first embodiment and the second embodiment, the subtraction processing of two colors for generating the image including the radiation information of the high tube voltage and the image including the radiation information of the low tube voltage has been described, but this is merely an example. For example, as exemplarily shown in FIG. 12, stepwise irradiation of radiation formed by three stages of the low tube voltage, the middle tube voltage, and the high tube voltage may be performed, and images of three colors corresponding to the low tube voltage, the middle tube voltage, and the high tube voltage, respectively, may be generated. The timing chart of FIG. 12 is different from the timing chart of FIG. 4 in that the image including the radiation information of the low tube voltage and the radiation information of the middle tube voltage is read out between the readout of the image 304 and the readout of the image 306 in FIG. 4. Further, the number of times of the sampling and holding operations may be increased to generate images of four or more colors. The timing of the sampling and holding operation may be changed by the method described in the first embodiment in accordance with mA setting and ms setting of radiation. The offset signal may be removed by a method similar to that in FIGS. 9 and 10.

A radiation imaging system 1 according to the third embodiment will be described below. Note that matters not mentioned as the third embodiment can follow the first embodiment or the second embodiment. In the third embodiment, a control apparatus 103 obtains or monitors the radiation generation condition based on information (parameter value) output from a radiation generating apparatus 101, and determines the timing of the sampling and holding operation based on the information.

Figure 13:
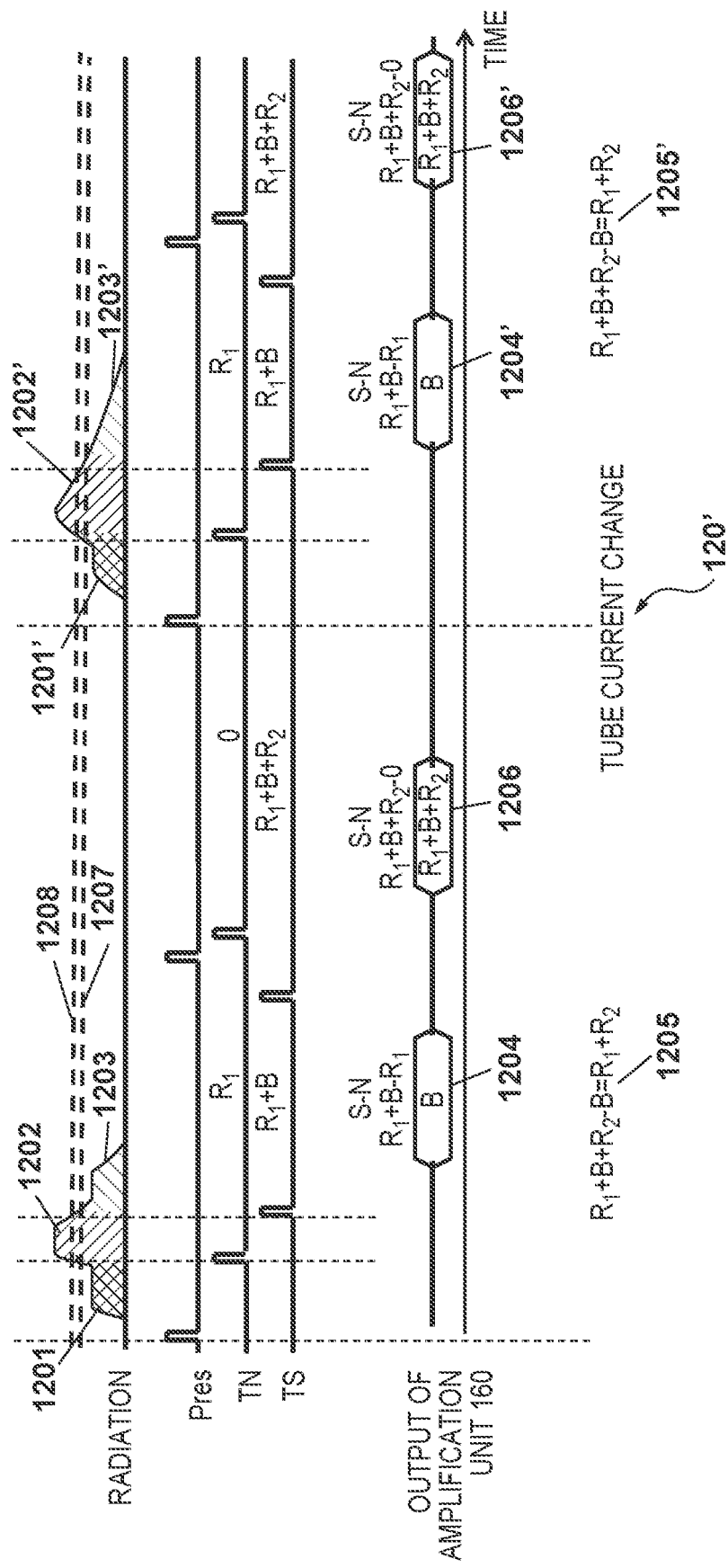
FIG. 13 is a timing chart exemplarily showing the operation of the radiation imaging system or a radiation imaging apparatus according to the third embodiment.

FIG. 13 exemplarily shows a process of acquiring or monitoring the radiation generation condition based on information (parameter value) output from the radiation generating apparatus 101 during fluoroscopic imaging, and determining, in real time, the timing of the sampling and holding operation based on the information in the third embodiment.

In the third embodiment, the control apparatus 103 can determine the timing of the sampling and holding operation based on a comparison, with threshold values 1207 and 1208, of the tube voltage as an example of information (parameter value) output from the radiation generating apparatus 101. For example, if the tube voltage is higher than the threshold value 1208, a second sample and hold circuit 276 can perform the sampling and holding operation by driving of a second sample and hold signal TN. If the tube voltage is lower than the threshold value 12707, a first sample and hold circuit 275 can perform the sampling and holding operation.

In the first to third embodiments, the radiation imaging system that performs energy subtraction has been described. However, the disclosed technique is not limited to this form. For example, if it is requested to perform irradiation of radiation over a longer time than a predetermined time by an ABC function, the timing of the sampling and holding operation may be changed.

In the first to third embodiments, an example has been described in which the timing of the sampling and holding operation is controlled based on the tube voltage of the radiation generating apparatus 101. However, the disclosed technique is not limited to this form. For example, a function of changing the filter of the radiation generating apparatus 101 may be provided to change the energy of radiation emitted to the radiation imaging apparatus 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128465, filed Aug. 10, 2022, which is hereby incorporated by reference herein in its entirety.

What is claimed is:
1. A radiation imaging apparatus, comprising:
a pixel array including a plurality of pixels configured to detect radiation; and a controller configured to obtain a radiation generation condition related to a radiation generating apparatus during fluoroscopic imaging, and determine, during the fluoroscopic imaging, timings of a plurality of sampling and holding operations in each of the plurality of pixels in accordance with the radiation generation condition, wherein the timing of at least one sampling and holding operation of the plurality of sampling and holding operations is a timing in an irradiation period of radiation, each of the plurality of pixels includes a conversion element configured to convert radiation into an electrical signal, and a sample and hold circuit configured to sample and hold signals from the conversion element multiple times in accordance with the timings, determined by the controller, of the plurality of sampling and holding operations, and the timings of the plurality of sampling and holding operations include a timing of sampling and holding a signal corresponding to radiation having a first energy, and a timing of sampling and holding a signal corresponding to radiation having a second energy different from the first energy.

2. The apparatus according to claim 1, wherein the timings of the plurality of sampling and holding operations include a timing of sampling and holding a signal not including information of an object.

3. The apparatus according to claim 1, wherein the controller obtains the radiation generation condition multiple times during fluoroscopic imaging and, each time the radiation generation condition is obtained, determines the timings of the plurality of sampling and holding operations.

4. The apparatus according to claim 1, wherein the controller includes a detection unit configured to detect a change of the radiation generation condition during fluoroscopic imaging and, based on an output of the detection unit, changes the timings of the plurality of sampling and holding operations.

5. The apparatus according to claim 4, wherein the detection unit detects the change of the radiation generation condition in accordance with an operation by an operator.

6. The apparatus according to claim 4, wherein the detection unit detects the change of the radiation generation condition caused by execution of auto brightness control.

7. The apparatus according to claim 1, wherein the controller continues to monitor the radiation generation condition during fluoroscopic imaging and, in accordance with the latest radiation generation condition, determines the timings of the plurality of sampling and holding operations.

8. The apparatus according to claim 1, wherein the controller obtains the radiation generation condition at least in a period from reception of a start instruction requesting to start fluoroscopic imaging to reception of an end instruction requesting to end the fluoroscopic imaging started in accordance with the start instruction.

9. The apparatus according to claim 1, wherein the timings of the plurality of sampling and holding operations include a timing of sampling and holding a signal including information of an object.

10. The apparatus according to claim 9, wherein the timings of the plurality of sampling and holding operations include a timing of sampling and holding a signal not including information of an object.

11. The apparatus according to claim 1, wherein the controller determines the timings of the plurality of sampling and holding operations, in accordance with a control information set selected from a plurality of control information sets in accordance with the radiation generation condition.

12. The apparatus according to claim 11, wherein the controller generates a control information set corresponding to the latest radiation generation condition based on at least some of a plurality of control information sets respectively associated with a plurality of radiation generation conditions and, based on the generated control information set, determines the timings of the plurality of sampling and holding operations.

13. The apparatus according to claim 1, wherein the controller obtains the radiation generation condition based on information output from the radiation generating apparatus.

14. The apparatus according to claim 13, wherein the information includes information concerning one of a tube voltage and a tube current, and the controller determines, based on one of the tube voltage and the tube current, the timings of the plurality of sampling and holding operations.

15. The apparatus according to claim 1, wherein the controller determines, with a periodic reference signal as a reference, the timings of the plurality of sampling and holding operations.

16. The apparatus according to claim 15, wherein the reference signal is a signal which resets the conversion element that converts radiation into an electrical signal.

17. A control apparatus, comprising:

a controller configured to determine, during fluoroscopic imaging, timings of a plurality of sampling and holding operations in each of a plurality of pixels configured to detect radiation, in accordance with a radiation generation condition related to a radiation generating apparatus, the radiation generation condition being obtained during the fluoroscopic imaging, wherein the timings of the plurality of sampling and holding operations include a timing of sampling and holding a signal corresponding to radiation having a first energy, and a timing of sampling and holding a signal corresponding to radiation having a second energy different from the first energy.

18. A control method, comprising:

determining, during fluoroscopic imaging, timings of a plurality of sampling and holding operations in each of a plurality of pixels configured to detect radiation, in accordance with a radiation generation condition related to a radiation generating apparatus, the radiation generation condition being obtained during the fluoroscopic imaging, wherein the timings of the plurality of sampling and holding operations include a timing of sampling and holding a signal corresponding to radiation having a first energy, and a timing of sampling and holding a signal corresponding to radiation having a second energy different from the first energy.

19. A non-transitory computer-readable storage medium storing a program for causing a computer to execute the method according to claim 18.

20. A radiation imaging apparatus, comprising:

a pixel array including a plurality of pixels configured to detect radiation; and a controller configured to obtain a radiation generation condition related to a radiation generating apparatus during fluoroscopic imaging, and determine, during the fluoroscopic imaging, timings of a plurality of sampling and holding operations in each of the plurality of pixels in accordance with the radiation generation condition, wherein the timing of at least one sampling and holding operation of the plurality of sampling and holding operations is a timing in an irradiation period of radiation, and the timings of the plurality of sampling and holding operations include a timing of sampling and holding a signal corresponding to radiation having a first energy, and a timing of sampling and holding a signal corresponding to radiation having a second energy different from the first energy.

\* \* \* \* \*